US012649223B2

(12) United States Patent
Kordus

(10) Patent No.: US 12,649,223 B2
(45) Date of Patent: Jun. 9, 2026

(54) POWER TOOL AND LOCKING MECHANISMS FOR MANUAL TORQUE APPLICATION

(71) Applicant: Snap-on Incorporated, Kenosha, WI (US)

(72) Inventor: Bryan J. Kordus, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 18/581,709

(22) Filed: Feb. 20, 2024

(65) Prior Publication Data

US 2025/0262740 A1 Aug. 21, 2025

(51) Int. Cl.
*B25F 5/00* (2006.01)
*B25B 21/00* (2006.01)

(52) U.S. Cl.
CPC .............. *B25F 5/001* (2013.01); *B25B 21/00* (2013.01)

(58) Field of Classification Search
CPC ................................ B25F 5/001; B25B 21/00
See application file for complete search history.

(56) References Cited

U.S. PATENT DOCUMENTS 3,908,108 A 9/1975 Hults
4,277,989 A 7/1981 Tracy
4,566,356 A 1/1986 Herota
4,722,253 A 2/1988 Chow
4,974,475 A * 12/1990 Lord .................... B25B 21/004 81/57.13
6,948,405 B1 9/2005 Simmons
7,458,295 B1 12/2008 Lu et al.
7,836,797 B2 11/2010 Hecht et al.
8,493,172 B2 7/2013 Pusateri et al.
8,800,680 B2 8/2014 Eshleman et al.
9,016,395 B2 4/2015 Scott
9,266,226 B2 2/2016 Timmons
9,475,180 B2 10/2016 Eshleman et al.
10,456,895 B2 10/2019 Ely
11,040,433 B1 6/2021 Terry, Jr.

(Continued)

FOREIGN PATENT DOCUMENTS

EP 0486710 A1 5/1992
GB 1263348 A 2/1972

(Continued)

OTHER PUBLICATIONS

UK Intellectual Property Office, Combined Search and Examination Report issued in corresponding Application No. GB2502354.0, dated Jul. 25, 2025, 10 pp.

(Continued)

*Primary Examiner* — Michelle Lopez
(74) *Attorney, Agent, or Firm* — Taft, Stettinius & Hollister LLP

(57) ABSTRACT

A motorized tool with a direct drive mechanism and a locking mechanism that allows the tool to be used to apply a manual load or torque. The tool includes a drive lug adapted to be driven in first and second rotational directions via a gear assembly, a motor adapted to drive the gear assembly to thereby the drive lug for the application of motorized torque, and a locking mechanism that is adapted to allow application of manual torque by the drive lug.

20 Claims, 9 Drawing Sheets

(56) References Cited

U.S. PATENT DOCUMENTS

| | | | | |
|---|---|---|---|---|
| 2009/0078091 | A1* | 3/2009 | Samudosky | B25B 21/00 81/57.11 |
| 2009/0114068 | A1 | 5/2009 | Lawrence | |
| 2014/0262394 | A1* | 9/2014 | Scott | B25B 23/0007 173/48 |
| 2015/0096413 | A1 | 4/2015 | Knight et al. | |
| 2020/0039035 | A1 | 2/2020 | Nick | |
| 2020/0055159 | A1* | 2/2020 | Sakai | B24B 47/12 |
| 2020/0130150 | A1 | 4/2020 | Nick et al. | |
| 2020/0391358 | A1* | 12/2020 | Banholzer | B25B 21/004 |
| 2021/0154806 | A1 | 5/2021 | White et al. | |
| 2022/0190752 | A1* | 6/2022 | Rajzer | H02P 3/06 |

FOREIGN PATENT DOCUMENTS

| | | | |
|---|---|---|---|
| JP | H0796469 | A | 4/1995 |
| JP | H07112373 | A | 5/1995 |
| WO | 2014190938 | A1 | 12/2014 |
| WO | 2021252701 | | 12/2021 |

OTHER PUBLICATIONS

Taiwan Patent Office, First Office Action issued in corresponding Application No. 114106172, dated Sep. 10, 2025, 34 pp.

Australian Patent Office, Examination Report No. 1 issued in corresponding Application No. 2025201128, dated Dec. 19, 2025, 3 pp.

* cited by examiner

POWER TOOL AND LOCKING MECHANISMS FOR MANUAL TORQUE APPLICATION

TECHNICAL FIELD OF THE INVENTION

The present invention relates generally to power tools, and more particularly to locking a motorized tool to perform manual loading.

BACKGROUND OF THE INVENTION

Power hand tools, such as, for example, motorized direct drive tools, motorized ratchet wrenches, impact wrenches, and other drivers, are commonly used in automotive, industrial, and household applications to install and remove threaded fasteners, and apply a torque and/or angular displacement to a work piece, such as a threaded fastener, for example. Power hand tools generally include an output member (such as a drive lug or chuck), a trigger switch actuatable by a user, an electric motor contained in a housing, and other components, such as switches, light emitting diodes (LEDs), and batteries, for example.

Conventional motorized ratchets utilize a switch disposed on the head of the tool to select rotational direction of the tool output. As the switch is disposed on the head, it can be challenging for a user to change the direction without first removing the tool from the fastener. It is especially challenging when the tool is engaged with a fastener in a tight space and the user cannot easily access the head of the tool.

When using a motorized direct drive tool, it may be desirable to apply a manual load to the work piece while using the tool. For example, manual torque application provides the benefit of better controlling the amount of torque application. However, conventional motorized direct drive tools cannot be easily used for manual torque application, because when applying manual torque, the drive lug will freely rotate. Therefore, to provide manual torque application with a power torque application tool, the drive lug must be rotationally locked.

SUMMARY OF THE INVENTION

The present invention relates broadly to a gear system and locking mechanism for a power tool. The tool generally includes a tool housing, an output assembly (such as a direct drive type mechanism with a drive lug) adapted to provide torque to a work piece, a trigger, and a motor housed in the housing. The output assembly includes a gear assembly linking the motor to the output assembly, such as a drive lug. The gear assembly includes spur gears, bevel gears and/or a worm gear drive to create a desired gear ratio to meet speed and torque requirements required at the output assembly. In an embodiment, the gear assembly includes a plurality of spur gears, arranged to provide a power tool with a low profile. The tool may include a toggle trigger to allow for forward and reverse rotational direction control of the motor, or the tool may include a single trigger with a separate switch to change motor direction.

With the tool, the trigger can be actuated to cause power to be supplied to the motor to rotate the drive lug to apply torque to a work piece in a motorized torque application mode. To apply manual torque to the work piece, via a user manually rotating the tool in a manual torque application mode, the drive mechanism must be rotationally locked with respect to the tool to prevent rotational movement, otherwise manual torque application on the work piece will back drive the gears and spin the motor thus failing to transfer any torque to the work piece.

The present invention includes various embodiments that lock or otherwise prevent the drive mechanism from rotating with respect to the tool, so that the tool can be used to apply manual torque to a work piece, via a user manually rotating the tool in a manual torque application mode.

In an embodiment, the present invention includes a power tool including a drive portion and a motor with a motor shaft adapted to rotationally drive the drive portion. The power tool includes a gear assembly operably coupled to the motor shaft and the drive portion and is adapted to transfer rotational motion of the motor shaft to the drive portion. The power tool also includes a locking mechanism adapted to selectively prevent rotation of at least one of the motor shaft, gear mechanism, and drive portion to allow manual torque application by the power tool.

The locking mechanism may be any one of various types of locking mechanisms. For example, the locking mechanism may include a lock button that, when actuated, causes all high-side or low-side switching elements to be placed in a conducting state to prevent rotation of the motor shaft. The locking mechanism may include an electric brake that allows the motor shaft to rotate when power is supplied to the motor, and selectively prevents rotation of the motor shaft when power is not being supplied to the motor. The locking mechanism may include a plate that is movable between locked and unlocked positions, wherein when in the locked position, the plate prevents rotation of the motor shaft, and when in the unlocked position, the plate allows the motor shaft to rotate. The locking mechanism may include a locking bar that is movable between locked and unlocked positions, wherein when in the locked position, the locking bar prevents rotation of the motor shaft, and when in the unlocked position, the locking bar allows the motor shaft to rotate. The locking mechanism may include a sprag clutch.

In another embodiment, the present invention includes a power tool including a drive portion and a motor with a motor shaft adapted to drive the drive portion. The power tool includes a gear assembly operably coupled to the motor shaft and the drive portion and adapted to transfer rotary motion of the motor shaft to the drive portion, wherein the gear assembly includes a worm gear coupled to the motor shaft and a spur gear meshingly engaged with the worm gear, and the spur gear is unable to rotate the worm gear when a manual load is applied to the drive portion.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION

Figure 1:
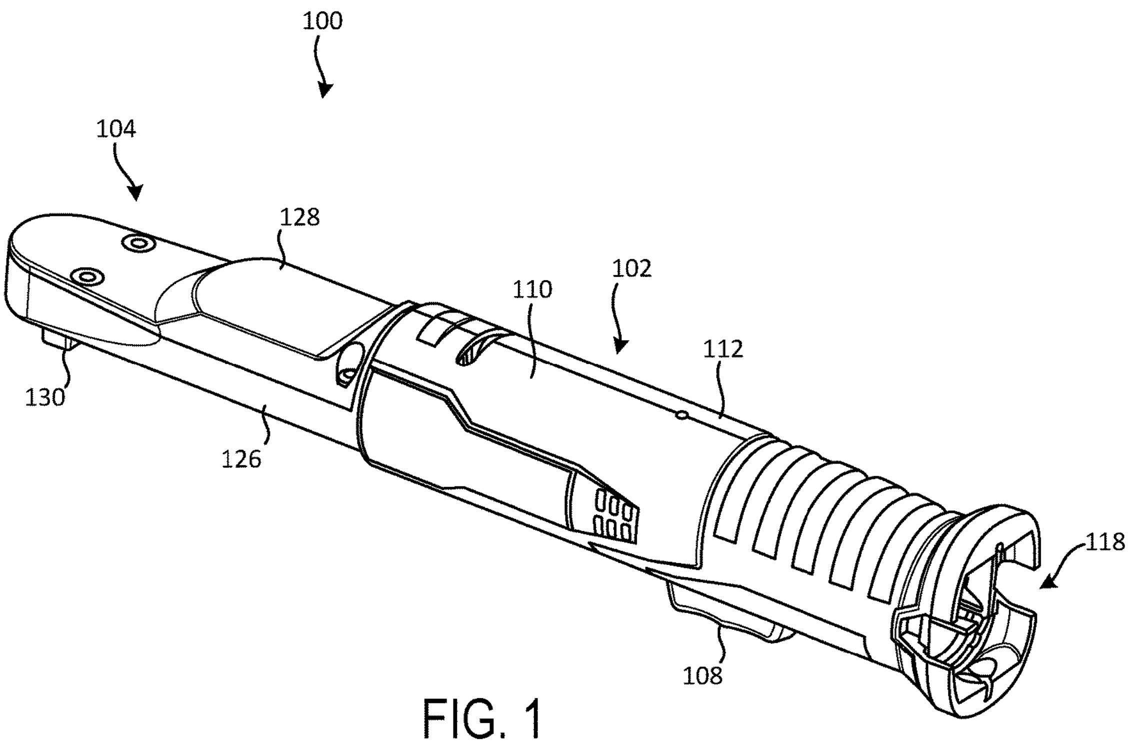
FIG. 1 is perspective view of an exemplar tool, incorporating an embodiment of the present invention.
Figure 2:
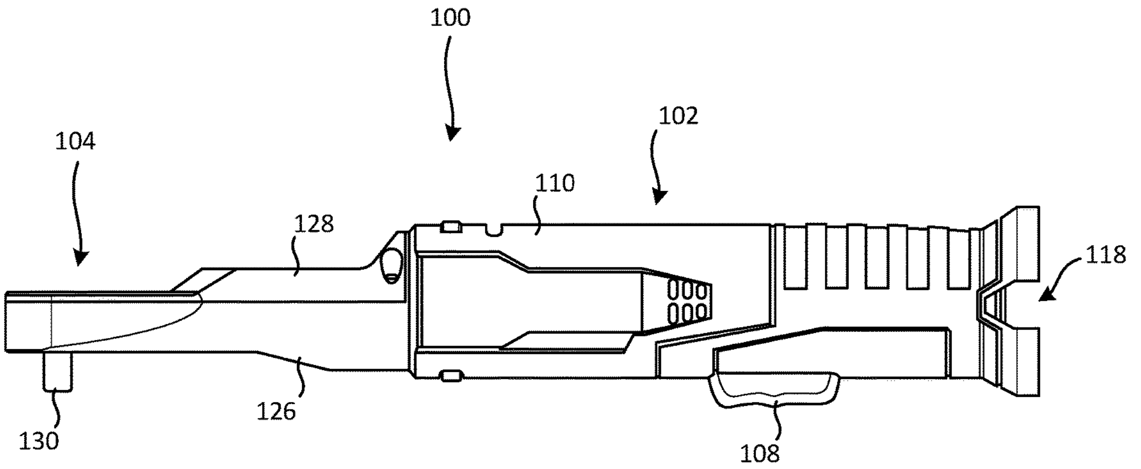
FIG. 2 is a side plan view of the exemplar tool of FIG. 1.
Figure 3:
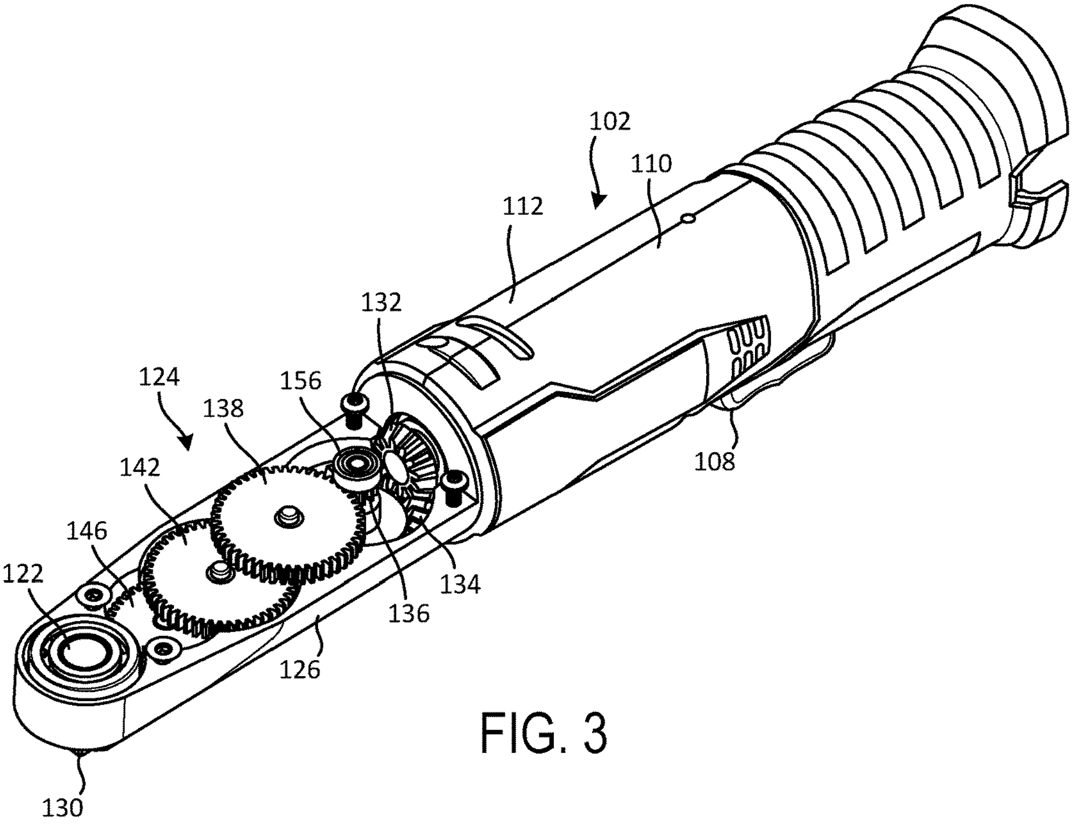
FIG. 3 is a perspective view of the exemplar tool of FIGS. 1 and 2, showing internal components of a head portion of the tool, according to an embodiment of the present invention.
Figure 4:
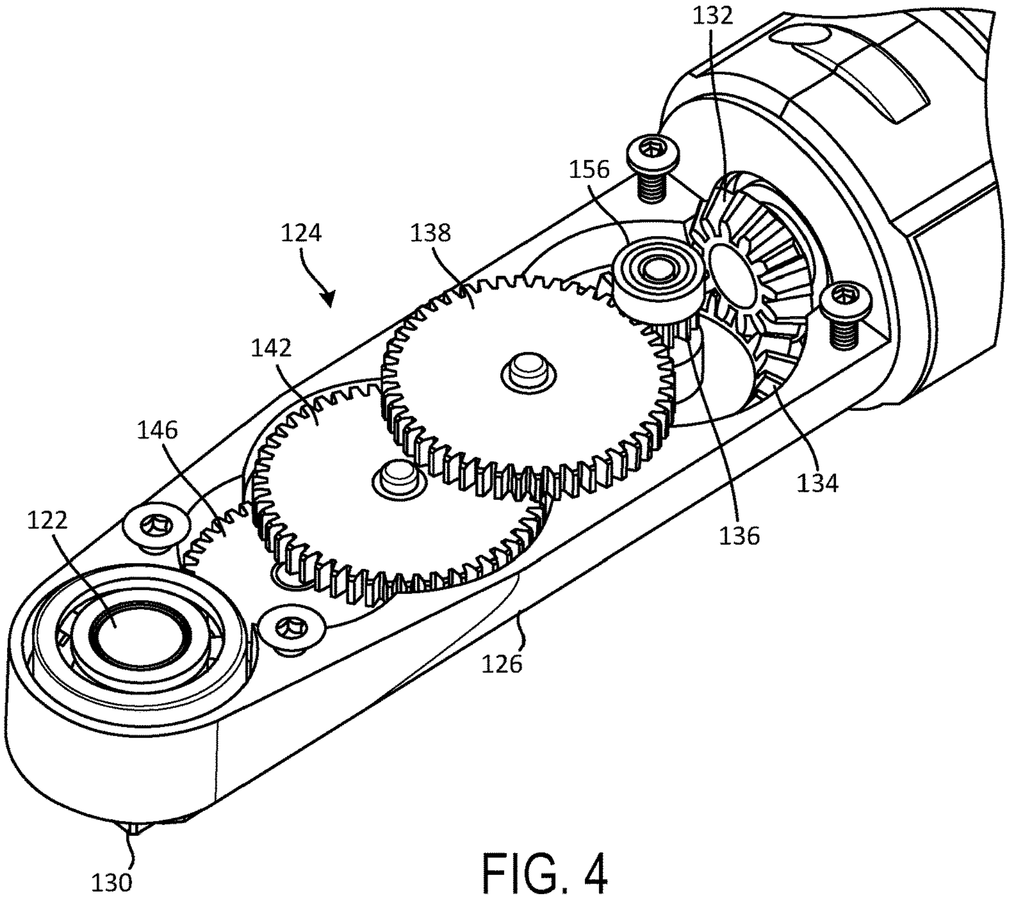
FIG. 4 is an enlarged perspective view showing internal components of a head portion of the tool of the tool of FIG. 3.

While the present invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term “present invention” is not intended to limit the scope of the claimed invention and is instead a term used to discuss exemplary embodiments of the invention for explanatory purposes only.

The present invention relates broadly to a gear system and locking mechanism for a power tool. The tool generally includes a tool housing, an output assembly (such as a direct drive type mechanism with a drive lug) adapted to provide torque to a work piece, a trigger, and a motor housed in the housing. The output assembly includes a gear assembly linking the motor to the output assembly, such as a drive lug. The drive lug may be engageable with tool extensions, such as sockets, which are engageable with work pieces. The gear assembly includes spur gears, bevel gears and/or a worm gear drive to create a desired gear ratio to meet speed and torque requirements required at the output assembly. In an embodiment, the gear assembly includes a plurality of spur gears, arranged to provide a power tool with a low or slim profile. The tool may include a toggle trigger to selectively reverse the rotational direction of the motor, or the tool may include a single trigger with a separate switch to change the motor direction.

With the tool, the trigger can be actuated to cause power to be supplied to the motor to rotate the drive lug to apply torque to a work piece in a motorized torque application mode. To apply a manual torque to the work piece, via a user manually rotating the tool in a manual torque application mode, the drive mechanism must be rotationally locked in place with respect to the tool, otherwise the manual torque application will back drive the gears and spin the motor, thus preventing manual torque application to a work piece. The present invention includes various alternate embodiments that can selectively or automatically rotationally lock the drive mechanism, so that a manual torque application may be applied. Therefore, the present invention provides the ability to use a power tool, such as the tool disclosed herein, selectively in either a motorized or powered torque application, where torque is applied to a work piece via the motor, or a manual torque application, where torque is applied to a work piece via manual rotation of the tool by a user. This is beneficial, for example, where more manual control over torque application is desired. Manual torque application has the benefit of better controlling torque application.

Referring to FIGS. 1-7, a tool 100, such as a motorized direct drive type tool, is illustrated. The tool 100 includes a tool housing 102, an output assembly 104 (such as a direct drive type head assembly) operably coupled to the tool housing 102, a motor 106 disposed in the tool housing 102 and operably coupled to the output assembly 104, and a trigger 108 operably coupled to the motor 106 and actuatable to operate the motor 106 and thereby the output assembly 104. In an example, the tool housing 102 may include first and second housing portions 110, 112 (respectively forming first and second sides of the housing 102) that are coupled together in a clamshell type manner and coupled to the output assembly 104. In another example, the tool housing 102 (including the first and second housing portions 110, 112) may be a single integrated or monolithic piece.

The tool housing 102 may enclose or house internal components of the tool 100, such as the motor 106, a switch assembly 114 (shown in FIG. 6), motor control electronics and/or controller (which may be incorporated into the switch assembly 114 or separate), and power source components, such as terminals 116 adapted to operably couple to a battery, such as a rechargeable type battery) that may be received in a battery receiving portion 118 of the tool housing 102. The tool may also include other components, such as a display for configuring and setting the tool, one or more indicators such as light emitting diodes, and other components for operation of the tool, for example. The tool housing 102 may also include a textured or knurled grip to improve a user’s grasp of the tool 100 during use.

Figure 5:
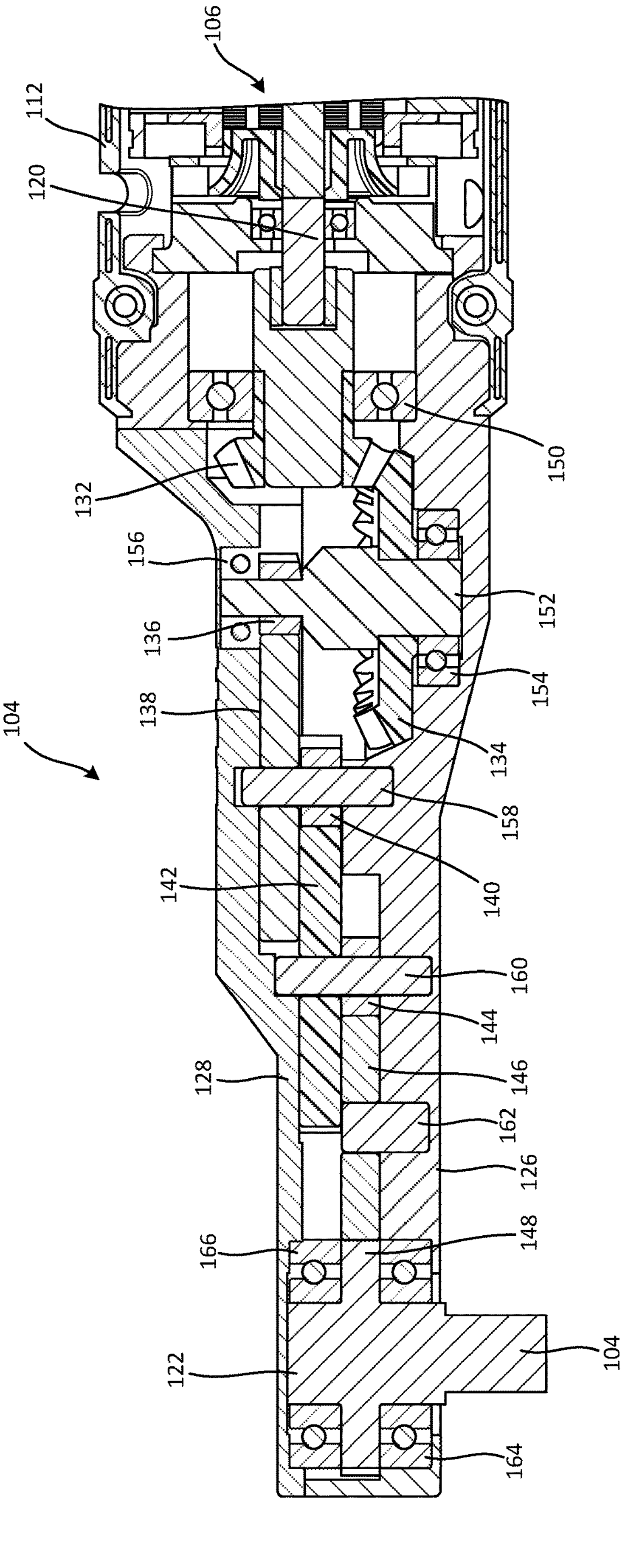
FIG. 5 is a cross-sectional side view of the head portion of the exemplar tool of FIGS. 1 and 2.

The motor 106 is disposed in and supported in the tool housing 102 and operably coupled to the trigger 108 via the switch assembly 114. The motor 106 includes a motor shaft 120 (as shown in FIG. 5) that is operably coupled to the output assembly 104, as described in further detail below. Thus, actuation of the trigger 108 by a user causes the motor 106 to operate and rotate the output assembly 104 in a desired rotational direction.

The motor 106 may be a brushless or brushed type motor, or any other suitable motor. A power source can be associated with the tool 100 to provide electric or other forms of power to the tool 100, such as, for example, electric, hydraulic, or pneumatic, to operate the motor 106. In an embodiment, the power source (not shown) can be housed in the battery receiving portion 118 of the tool housing 102, opposite the output assembly 104, a midsection of the tool 100, or any other portion of the tool 100/tool housing 102. The power source may also be an external component that is not housed by the tool 100, but that is operatively coupled to the tool 100 through, for example, hoses, wires or wireless means. In an embodiment, the power source is a removable and rechargeable battery that is adapted to be disposed in the battery receiving portion 116 of the tool housing 102 and electrically coupled to corresponding terminals 116 of the tool 100.

The output assembly 104 includes an output assembly housing adapted to house components of a direct drive mechanism, including a drive portion 122 and a gear assembly 124 operably coupled to and adapted to drive the drive portion 122. In an embodiment, the output assembly housing includes first and second output assembly housing portions 126, 128. The components of the drive portion 122 and a gear assembly 124 may be assembled into the first output assembly housing portion 126, and the second output assembly housing portion 128 may act as a cover and be coupled to the first output assembly housing portion 126 to house the components.

The drive portion 122 may include a drive lug 130, for example. The drive lug 130 is adapted to apply torque to a work piece, such as a fastener, via an adapter, bit, or socket coupled to the drive lug 130, such as a bi-directional ratchet square or hexagonal drive. As illustrated, the drive lug 130 is oriented at about a 90 degree angle with respect to a longitudinal axis of the tool 100 and/or tool housing 102, and is a square "male" connector designed to fit into or matingly engage a female counterpart, such as, for example, a socket. However, the drive lug 130 may be oriented at other angles with respect to the longitudinal axis. The drive portion 122 may alternatively include a "female" connector designed to matingly engage a male counterpart. The drive portion 122 may also be structured to directly engage a work piece without requiring coupling to an adapter, bit, or socket.

The gear assembly 124 operably couples the drive portion 122 to the motor shaft 120 and is adapted to transfer rotational motion of the motor shaft 120 to the drive portion 122. Referring to FIGS. 3-6, the gear assembly 124 includes a first bevel gear 132 coupled to the motor shaft 120, a second bevel gear 134 meshingly engaged with the first bevel gear 132, and a plurality of spur gears adapted to transfer rotational motion of the motor shaft 120, and first and second bevel gears 132, 134, to the drive portion 122. In an example, the gear assembly 124 includes first through sixth spur gears 136-146. However, it will be appreciated that more or less spur gears may be used based on the application.

As shown in FIG. 5, the first bevel gear 132 is disposed on and rotatable with the motor shaft 120. The first bevel gear 132 is also supported in the first output assembly housing portion 126 by a bearing 150 with an inner diameter of the bearing 150 engaged (such as via interference or press-fit engagement) with an outer surface of a shaft portion of the first bevel gear 132, and an outer diameter of the bearing 150 engaged (such as via clearance-fit, interference fit, or press-fit engagement) with an inner bearing surface of the first output assembly housing portion 126. The first bevel gear 132 also include gear teeth meshingly engaged with gear teeth of the second bevel gear 134.

The second bevel gear 134 and first spur gear 136 are coupled to and rotatable with a first gear shaft 152. The second bevel gear 134 is coupled to and disposed proximal to a first end of the first gear shaft 152 that is supported in the first output assembly housing portion 126 by a bearing 154. The first spur gear 136 is coupled to and disposed proximal to a second end of the first gear shaft 152 that is supported in the second output assembly housing portion 128 by a bearing 156.

The second spur gear 138 and third spur gear 140 are coupled to and rotatable with a second gear shaft 158. The second spur gear 138 is coupled to and disposed proximal to a first end of the second gear shaft 158 that is supported in the second output assembly housing portion 128, and the third spur gear 140 is coupled to and disposed proximal to a middle or a second end of the second gear shaft 158 that is supported in the first output assembly housing portion 126. The second spur gear 138 is also aligned with and includes gear teeth meshingly engaged with gear teeth of the first spur gear 136.

The fourth spur gear 142 and fifth spur gear 144 are coupled to and rotatable with a third gear shaft 160. The fourth spur gear 142 is coupled to and disposed proximal to a first end of the third gear shaft 160 that is supported in the second output assembly housing portion 128, and the fifth spur gear 144 is coupled to and disposed proximal to a middle or a second end of the third gear shaft 160 that is supported in the first output assembly housing portion 126. The fourth spur gear 142 is also aligned with and includes gear teeth meshingly engaged with gear teeth of the third spur gear 140.

The sixth spur gear 146 is coupled to and rotatable with a fourth gear shaft 162 that is supported in the first output assembly housing portion 126. The sixth spur gear 146 is also aligned with and includes gear teeth that are meshingly engaged with gear teeth of the fifth spur gear 144 and meshingly engaged with gear teeth of an output gear portion 148 of the drive portion 122. As shown in FIG. 5, the drive portion 122 is supported in the first and second output assembly housing portions 126, 128 by bearings 164, 166, respectively, disposed on opposite sides of the output gear portion 148, with the drive lug 130 extending out of the first output assembly housing portion 126.

The trigger 108, which can be actuated by a user to selectively cause power to be supplied from a power source, is operable to cause the motor 106 to provide torque to the output assembly 104 to cause the drive portion 122/drive lug 130 to rotate in a desired rotational direction. The trigger 108 may also be operably coupled to the switch assembly 114 that is adapted to cause power to be supplied from the power source to the motor 106 when the trigger 108 is actuated.

In an example, the trigger 108 is a toggle trigger capable of rotating or pivoting in first and second toggle directions to cause the motor 106 to rotate the motor shaft 120, where the first toggle direction drives the motor shaft 120 in a first motor direction (or first rotational direction), and the second toggle direction drives the motor shaft 120 in a second motor direction (or second rotational direction). The rotational direction of the drive portion 122/drive lug 130 may correspond to the motor direction, and thus can be selected by actuation of the trigger 108 in the desired first or second toggle direction. Additionally, the trigger 108 and/or switch assembly 114 may also include a variable speed type mechanism. In this regard, actuation of the trigger 108 causes the motor to operate at a faster speed the further the trigger 108 is actuated.

In another example, the trigger 108 can be a linearly depressible type trigger, where a user can depress the trigger 108 inwardly to selectively cause power to be supplied from a power source and cause the motor 106 to provide torque to the output assembly 104 and cause the drive portion 122/drive lug 130 to rotate in a desired rotational direction. The trigger 108 may again be operably coupled to the switch assembly 114 that is adapted to cause power to be supplied from the power source to the motor 106 when the trigger 108 is actuated. The trigger 108 may also be outwardly biased, relative to the tool housing 102, such that the trigger 108 is inwardly depressible by a user to cause the tool 100 to operate, and a release of the trigger 108 causes the trigger

108 to biasedly move outwardly, relative to the tool housing 102, to cease operation of the tool 100 via the biased nature of the trigger 108. The trigger 108 and switch assembly 114 may also be a variable speed type mechanism. In this regard, actuation or depression of the trigger 108 causes the motor to operate at a faster speed the further the trigger 108 is depressed. However, any suitable trigger 108 or switch can be implemented without departing from the spirit and scope of the present invention.

In an example, the motor 106 is a brushless DC (BLDC) motor, and the tool 100 includes motor control electronics and/or controller(s) (which may be incorporated into the switch assembly 114 or separate) operably coupled to and adapted to control the motor 106. For example, referring to FIG. 7, the motor control electronics may include a printed circuit board (PCB) including one or more switching elements disposed thereon. The switching elements may be field effect transistors (FETs), such as, for example, metal-oxide semiconductor field-effect transistors (MOSFETs). In an embodiment, the switching elements may include three high-side switching elements, H1, H2, and H3, and three low-side switching elements, L1, L2, and L3, each being operable in either one of a first or conducting state and a second or non-conducting state. The switching elements are controlled by the PCB to selectively apply power from a power source (e.g., a battery pack) to the motor 106 to achieve desired commutation. By selectively activating particular high-side and low-side switching elements, the motor 106 is operated by having the motor control electronics or controller send a current signal through coils located on a stationary part of the motor 106 called a stator. The coils cause a magnetic force to be applied to a rotating part of the motor 106, called a rotor, when current runs through the coils. The rotor contains permanent magnets that interact with the magnetic forces caused by the windings of the stator. By selectively activating successive combinations of high and low-side switching elements in a particular order, thereby sending a particular order of current signals through the windings of the stator, the stator creates a rotating magnetic field which interacts with the rotor causing it to rotate, which rotates the motor shaft 120 in a desired direction and at a desired speed, in a well-known manner.

Thus, when the tool 100 is used in a motorized torque application mode, the trigger 108 is actuated and the motor control electronics and/or controller(s) cause the motor shaft 120 to rotate, depending on actuation of the trigger 108, and thereby cause the first bevel gear 132 to rotate. The first bevel gear 132 causes the second bevel gear 134 and first spur gear 136 to rotate. The first spur gear 136 causes the second spur gear 138 and third spur gear 140 to rotate. The third spur gear 140 causes the fourth spur gear 142 and fifth spur gear 144 to rotate. The fifth spur gear 144 causes the sixth spur gear 146 to rotate, and the sixth spur gear 146 causes the drive portion 122/drive lug 130 to rotate and apply motorized torque to a work piece.

However, it may be desirable for a user to apply a manual load or torque to a work piece, by rotating the tool 100 by hand, in a manual torque application mode. In this situation, the tool 100 includes a locking mechanism that locks rotation of the drive mechanism (i.e., the drive portion 122 and/or gear assembly 124) with respect to the tool 100 to prevent the drive portion 122 and/or gear assembly 124 from back driving and spinning the motor shaft 120.

Figure 6:
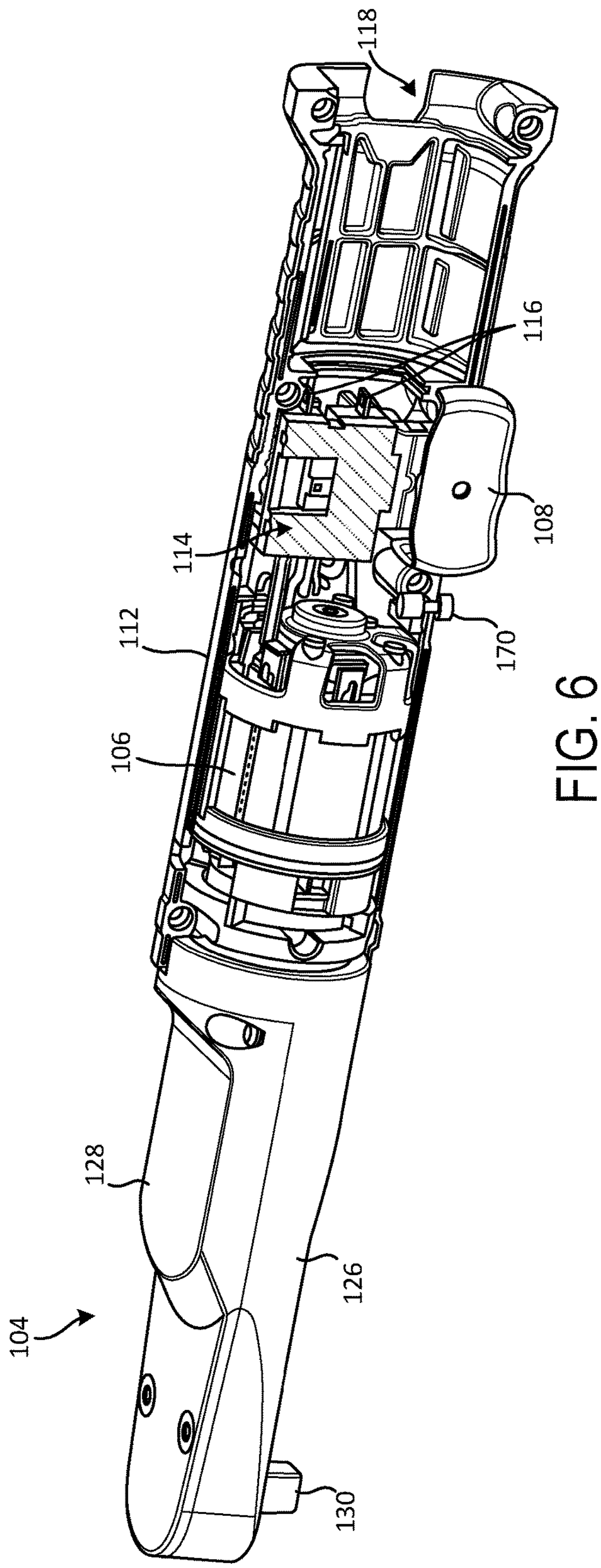
FIG. 6 is a perspective view of the exemplar tool of FIGS. 1 and 2, showing internal components of the tool, according to an embodiment of the present invention.
Figure 7:
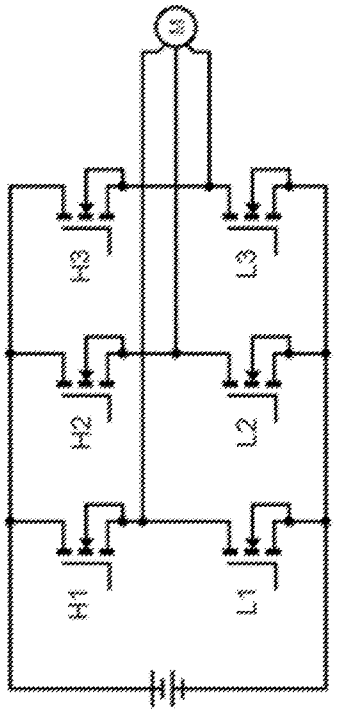
FIG. 7 is a diagram showing the high and low side switches for controlling a brushless DC motor, according to an embodiment of the present invention.

Referring to FIG. 6, in an embodiment, the tool 100 includes a locking mechanism in the form of a lock button 170 that is operably coupled to the motor control electronics and/or controller(s). When the lock button 170 is selectively depressed or otherwise actuated by a user, the motor control electronics and/or controller(s) activates (i.e., places in a conducting state) all high-side switching elements (H1, H2, and H3). This causes the motor 106 to rotationally hold or lock a position of the rotor and/or motor shaft 120 and allows for the tool 100 to be used in a manual torque application mode, in which a user can apply manual torque to a work piece by rotating the tool 100 by hand. During manual loading or torquing, the high-side switching elements (H1, H2, and H3) prevent the drive portion 122 and/or gear assembly 124 from being back driven.

Alternately, when the lock button 170 is depressed or otherwise actuated by a user, the motor control electronics and/or controller(s) activates (i.e., places in a conducting state) all low-side switching elements (L1, L2, and L3). This causes the motor 106 to rotationally hold or lock a position of the rotor and/or motor shaft 120 and allows for the tool 100 to be used in the manual torque application mode, in which a user can apply manual torque to a work piece by rotating the tool 100 by hand. During manual loading or torquing, the low-side switching elements (L1, L2, and L3) prevent the drive portion 122 and/or gear assembly 124 from being back driven.

Figure 8:
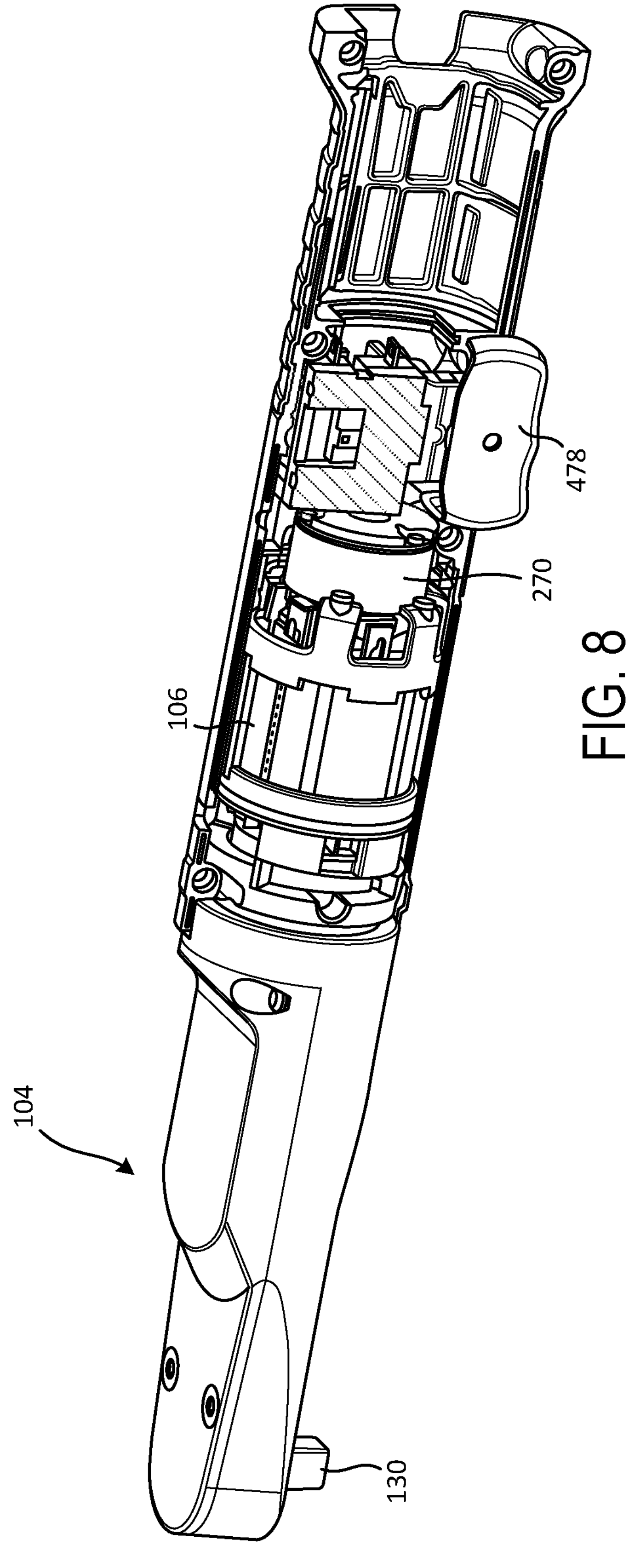
FIG. 8 is a perspective view of an exemplar tool, showing an internal portion of the tool, according to another embodiment of the present invention.

Referring to FIG. 8, in another embodiment, the tool 100 includes a locking mechanism in the form of an electrically off brake 270. The electrically off brake 270 may be operably coupled to a rear end of the motor shaft 120 and/or rotor of the motor 106 behind the motor 106, between the motor 106 and the switching assembly 114. Alternately, the electrically off brake 270 may be operably coupled to a front end of the motor shaft 120 between the motor 106 and the gear assembly 124. The electrically off brake 270 is also operably coupled to the trigger 108, switch assembly 114, motor control electronics and/or controller. The electrically off brake 270 is normally in a locked position when the trigger 108 is not actuated (i.e., the motor is not being supplied with power) and automatically locks a rotational position of the motor shaft 120 and thereby rotation of the drive portion 122 and/or gear assembly 124 with respect to the tool 100. The electrically off brake 270 may mechanically clamp, by means of a spring clamping a friction material against the motor shaft 120 and/or rotor of the motor 106 to rotationally hold and prevent the motor shaft 120 and/or rotor from rotating to allow for the tool 100 to be used in the manual torque application mode, in which a user can apply manual torque to a work piece by rotating the tool 100 by hand. During manual loading or torquing, the electrically off brake 270 prevents the drive portion 122 and/or gear assembly 124 from being back driven.

Once the trigger 108 is actuated, the tool 100 operates in the motorized torque application mode to apply motorized torque to a work piece, and electric power is applied to the electrically off brake 270 causing the electrically off brake 270 to release (i.e., be in an unlocked position), for example, by means of a solenoid, When the electrically off brake 270 is released, the motor shaft 120 and/or rotor of the motor 106 are allowed to rotate to apply motorized torque to a work piece. When trigger 108 is released, the electrically off brake 270 will return to its normal locked position automatically locking the motor shaft 120 and/or rotor from rotating, and the tool 100 can again be used in the manual torque application mode, in which a user can apply manual torque to a work piece by rotating the tool 100 by hand.

Figure 9:
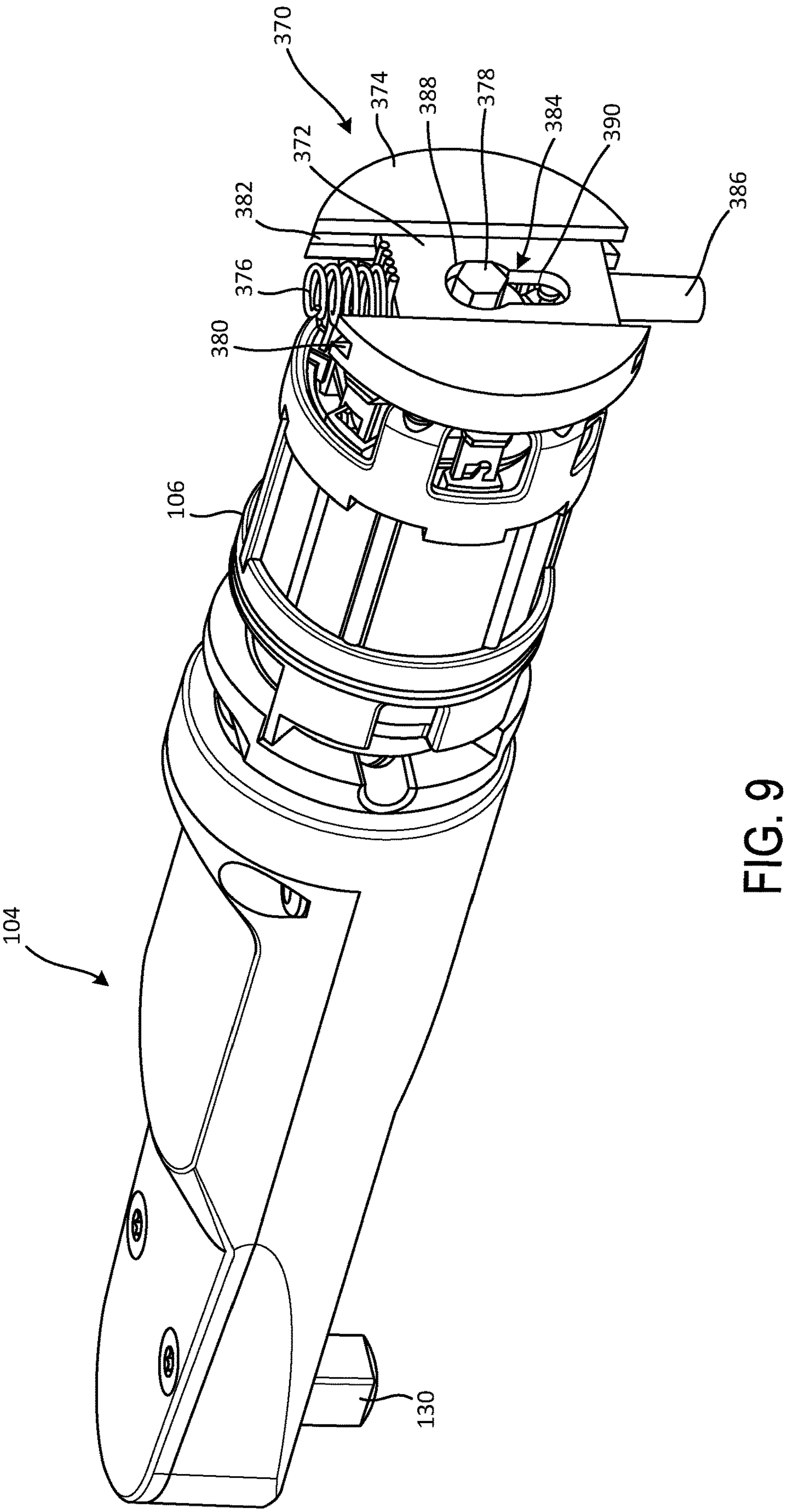
FIG. 9 is a perspective view of a head portion and motor of an exemplar tool, according to another embodiment of the present invention.

Referring to FIG. 9, in another embodiment, the tool 100 includes a locking mechanism in the form of a mechanical lock mechanism 370. The mechanical lock mechanism 370 includes a plate 372, a plate guide 374, and bias member

376, and a hex portion 378 coupled to or formed on a rear end of the motor shaft 120. The plate guide 374 may be a separate piece disposed in and coupled to the tool housing 102 behind the motor 106 or formed directly in the tool housing 102. The plate guide 374 includes first and second plate slots 380, 382 adapted to respectively receive first and second sides of the plate 372 and allow the plate 372 to slide within the first and second plate slots 380, 382.

The plate 372 is slidably disposed in the first and second plate slots 380, 382 and includes a keyhole 384 and a lock button 386 extending from an end of the plate 372, and the lock button 386 is adapted to extend out of the tool housing 102 when the mechanical lock mechanism 370 is assembled into the tool housing 102. The keyhole 384 includes a first hole portion 388 that receives and is larger than the hex portion 378, and a second hole portion 390 that that is adapted to engage opposing sides of the hex portion 378 when the hex portion 378 is disposed in the second hole portion 390.

The bias member 376 may be in the form of a spring or other type of bias member. The bias member 376 applies a bias force to an end of the plate 372 opposite the lock button 386 to bias the plate 372 in a first direction to cause the hex portion 378 to be disposed in the first hole portion 388. When the hex portion 378 is disposed in the first hole portion 388, the mechanical lock mechanism 370 is in an unlocked position. In the unlocked position, the tool 100 can be used in the motorized torque application mode to apply motorized torque to a work piece.

However, when a user selectively depresses the lock button 386 against the force of the bias member 376, the plate 372 is slid or moved along the first and second slots in a second direction to cause the hex portion 378 to be disposed in the second hole portion 390. When the hex portion 378 is disposed in the second hole portion 390, edges of the plate 372 surrounding the second hole portion 390 engage opposing sides of the hex portion 378 and prevent the motor shaft 120 and/or rotor of the motor 106 from rotating, and the mechanical lock mechanism 370 is a locked position. In the locked position, the motor shaft 120 is prevented from rotating to allow for the tool 100 to be used in the manual torque application mode, in which a user can apply manual torque to a work piece by rotating the tool 100 by hand.

When the lock button 386 is released, the bias member 376 biases the plate 372 in the first direction to cause the hex portion 378 to be disposed in the first hole portion 388 to dispose the mechanical lock mechanism 370 in the unlocked position.

Figure 10:
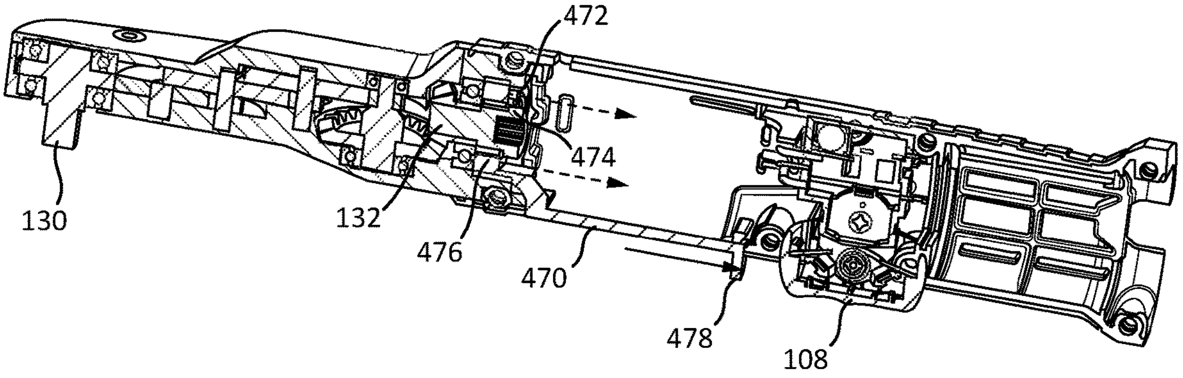
FIG. 10 is a cross-sectional view of an exemplar tool, according to another embodiment of the present invention.
Figure 11:
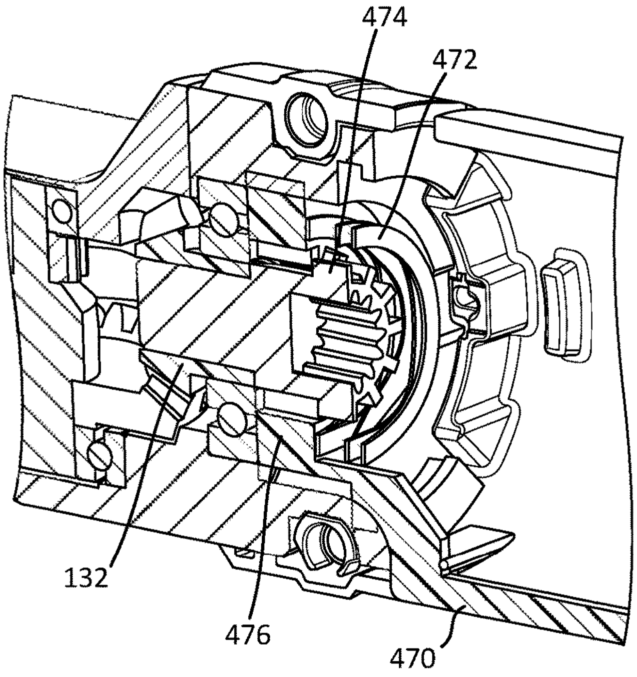
FIG. 11 is a cross-sectional view of a head portion of the exemplar tool of FIG. 10.

Referring to FIGS. 10 and 11, in another embodiment, the tool 100 includes a locking mechanism in the form of a locking bar 470 and bias member 472. In this embodiment, the first bevel gear 132 is modified to include gear teeth 474 on an end of the shaft portion proximal to the motor 106. The mechanical locking bar 470 includes locking teeth 476 that engage the gear teeth 474 when the locking bar 470 is disposed in a locked position to prevent the gear assembly 124 and/or motor shaft 120 from rotating to allow for the tool 100 to be used in the manual torque application mode, in which a user can apply manual torque to a work piece by rotating the tool 100 by hand.

The bias member 472 may be in the form of a spring or other type of bias member. The bias member 472 applies a bias force to the locking bar 470 in a direction away from the trigger to cause the locking teeth 476 to be disengaged from the gear teeth 474. This causes the locking bar 470 to be disposed in an unlocked position. In the unlocked position, the tool 100 can be used in the motorized torque application mode to apply motorized torque to a work piece.

The locking bar 470 may include a tab 478 that is selectively movable by a user in a direction towards the trigger 108 to cause the locking bar 470 to move in a direction towards the trigger 108 and the locking teeth 476 to engage the gear teeth 474. When the locking teeth 476 are engaged with the gear teeth 474, the locking bar 470 is disposed in the locked position and prevents the gear assembly 124 and/or motor shaft 120 from rotating to allow for the tool 100 to be used in the manual torque application mode, in which a user can apply manual torque to a work piece by rotating the tool 100 by hand.

When the tab 478 is released, the bias member 472 biases the locking bar 470 in a direction away from the trigger to cause the locking teeth 476 to be disengaged from the gear teeth 474, and the locking bar 470 to be disposed in the unlocked position.

Figure 12:
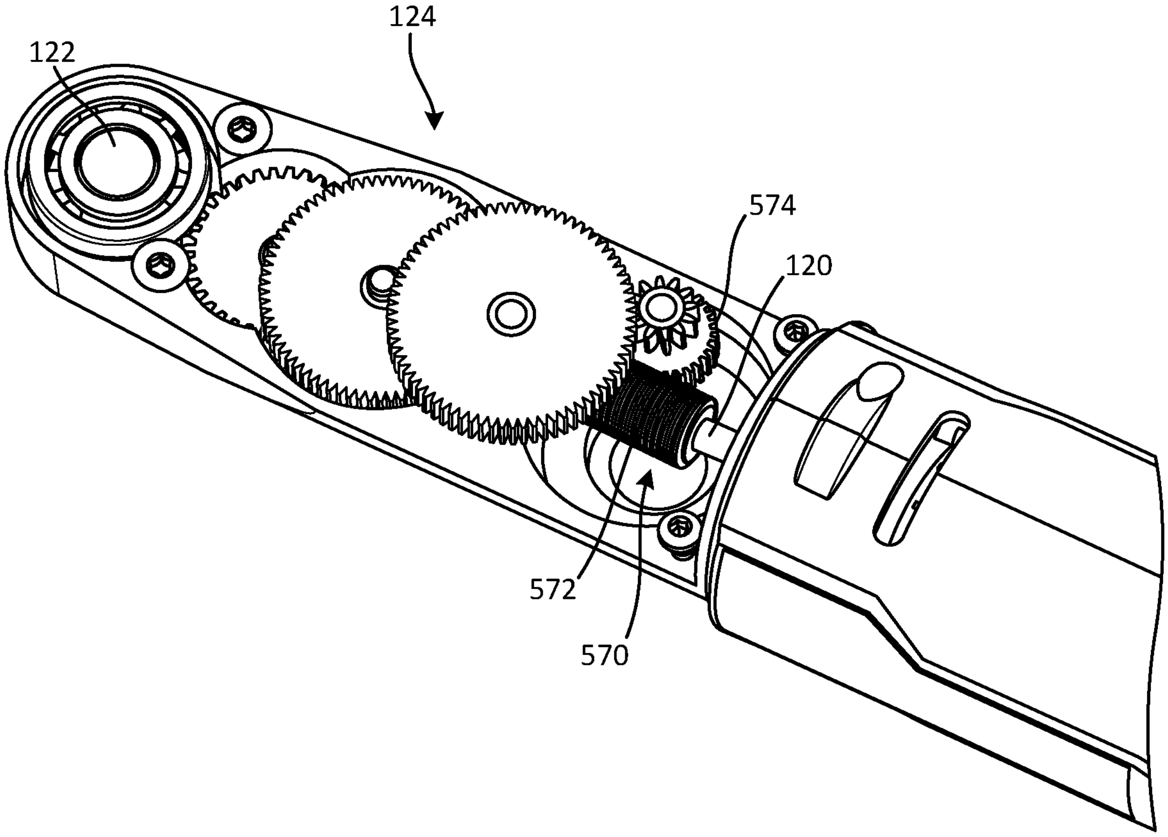
FIG. 12 is a perspective view of internal components of a head portion of an exemplar tool, according to another embodiment of the present invention.

Referring to FIG. 12, in another embodiment, the tool 100 includes a locking mechanism in the form of a modified gear assembly that includes a worm drive 570. The worm drive 570 includes a worm gear 572 coupled to the motor shaft 120, instead of the first bevel gear 132 described above, and a spur gear 574, instead of the second bevel gear 134 described above, that meshingly engages the worm gear 572. In this embodiment, in the motorized torque application mode, the worm gear 572 transmits power through the gear assembly including a plurality of spur gears (such as the first through sixth spur gears 136-146 described above) adapted to transfer rotary motion of the motor shaft 120, and worm gear 572 and spur gear 574 to the drive portion 122.

In this embodiment, the worm gear 572 provides an increased gear ratio in a small area compared to the bevel gears described above. The worm gear 572 may also automatically prevent the motor shaft 120 from rotating during manual loading. The spur gear 574 is disposed about 90 degrees relative to the worm gear 572, and the spur gear 574 is unable to rotate the worm gear 572 during manual loading because the spur gear 574 does not provide enough rotational force to overcome the frictional force between the spur gear 574 and the worm gear 572. Thus, the worm drive 570 allows motorized torque to be applied to a work piece via the tool 100, but also prevents the gear assembly and/or motor shaft 120 from being back driven to allow for manual torque to be applied to a work piece via a user rotating the tool 100 by hand.

Figure 15:
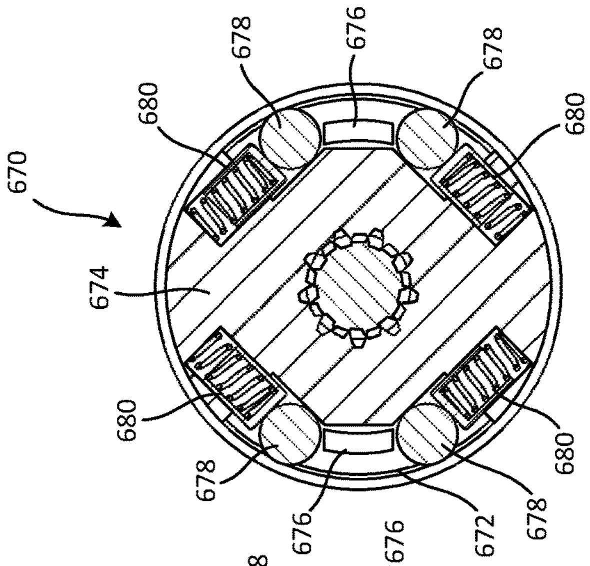
FIG. 15 is a cross-sectional view of the sprag clutch of FIG. 14, according to an embodiment of the present invention.
Figure 14:
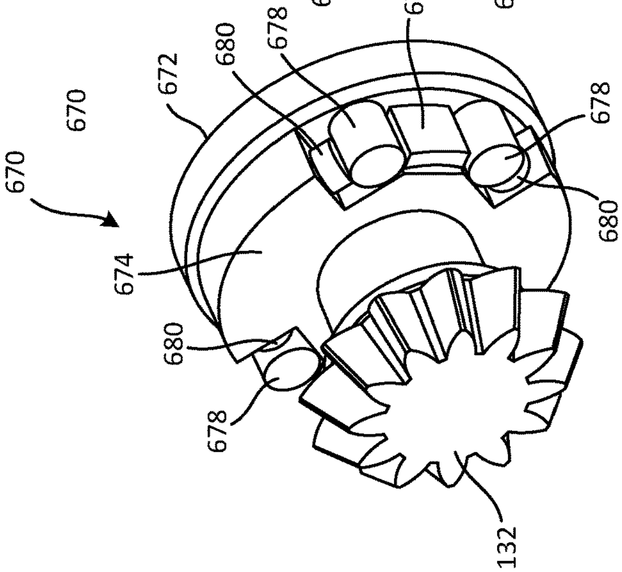
FIG. 14 is an enlarged view of a sprag clutch of the exemplar tool of FIG. 13, according to an embodiment of the present invention.
Figure 13:
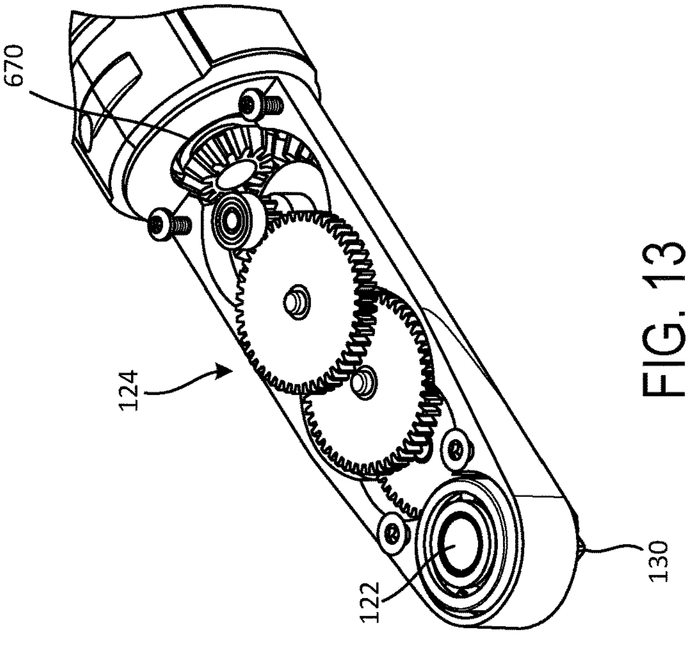
FIG. 13 is a perspective view of internal components of a head portion of an exemplar tool, according to another embodiment of the present invention.

Referring to FIGS. 13-15, in another embodiment, the tool 100 includes a locking mechanism in the form of a two-way sprag clutch 670. The two-way sprag clutch 670 may be disposed between the motor shaft 120 and the first bevel gear 132. The two-way sprag clutch 670 includes an input plate 672 and a driven plate 674. The input plate 672 includes two lugs 676, that in either direction respectively push on pairs of rollers 678 that prevent the sprag clutch 670 from locking and allow for the transmission of power to the drive portion 122 when the tool is used in the motorized torque application mode to apply motorized torque to a work piece. However, when power is not being supplied to the motor 106, the sprag clutch 670 automatically locks the gear assembly 124 from rotation. For example, when the tool is used in the manual torque application mode to apply manual torque to a work piece via a user rotating the tool 100 by hand, a manual load is applied to the sprag clutch 670 in either direction, and plungers or springs 680 respectively push the rollers 678, wedging the rollers 678 against the tool housing 102 or an inner bearing surface of the first output assembly housing portion 126. The rollers 678 lock the gear assembly 124 from rotation during manual application of torque, and the sprag clutch 670 remains locked until the tool 100 is driven via the motor or a manual load is applied in an opposite direction.

Thus, the tool 100 can be used to apply torque to a work piece in a motorized torque application mode via actuation of the trigger 108, which causes power to be supplied to the motor 106 to rotate the drive lug 130. The tool 100 can also be used to apply torque to a work piece in a manual torque application mode via a user manually rotating the tool 100. As described herein various locking mechanism can be used to selectively rotationally lock the drive mechanism, so that a manual torque application may be applied to a work piece. Therefore, the present invention provides the ability to use a power tool, such as the tool 100, selectively in either a motorized or powered torque application.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A power tool including a drive portion adapted to engage a work piece and a motor having high-side and low side switching elements and a motor shaft adapted to drive the drive portion, the power tool comprising:

a gear assembly operably coupled to the motor shaft and the drive portion and adapted to transfer rotational motion of the motor shaft to the drive portion; and a locking mechanism including a lock button that when actuated causes all the high-side switching elements or all the low-side switching elements to be placed in a conducting state adapted to lock rotation of the motor shaft to allow for manual torque application to the work piece with the power tool.

2. The power tool of claim 1, further comprising a trigger that when actuated, causes power to be supplied to the motor to rotate the motor shaft.

3. The power tool of claim 2, wherein the trigger is a toggle trigger actuatable in first and second toggle directions.

4. The power tool of claim 3, wherein when the toggle trigger is actuated in the first toggle direction, the motor causes the motor shaft to rotate in a first rotational direction, and when the toggle trigger is actuated in the second toggle direction, the motor causes the motor shaft to rotate in a second rotational direction.

5. A power tool including a drive portion and a motor with a motor shaft adapted to drive the drive portion, the power tool comprising:

a gear assembly operably coupled to the motor shaft and the drive portion and adapted to transfer rotational motion of the motor shaft to the drive portion, wherein the gear assembly includes a worm gear coupled to the motor shaft and a spur gear meshingly engaged with the worm gear, and the spur gear is unable to rotate the worm gear when a manual torque application is applied by the drive portion.

6. The power tool of claim 5, further comprising a trigger that, when actuated, causes power to be supplied to the motor to cause the motor shaft to rotate to cause the drive portion to rotate.

7. The power tool of claim 6, wherein the trigger is a toggle trigger selectively actuatable in first and second toggle directions.

8. The power tool of claim 7, wherein when the toggle trigger is actuated in the first toggle direction, the motor causes the motor shaft to rotate in a first rotational direction, and when the toggle trigger is actuated in the second toggle direction, the motor causes the motor shaft to rotate in a second rotational direction.

9. The power tool of claim 6, wherein the motor is a brushless motor.

10. The power tool of claim 9, further comprising motor control electronics operably coupled to the motor and the trigger and adapted to control operation of the motor.

11. A power tool including a drive portion adapted to engage a work piece and a motor with a motor shaft adapted to drive the drive portion, the power tool comprising:

a gear assembly operably coupled to the motor shaft and the drive portion and adapted to transfer rotational motion of the motor shaft to the drive portion; and a locking mechanism including an electrically off brake that is adapted to lock rotation of at least one of the motor shaft, gear mechanism, and drive portion to allow for manual torque application to the work piece with the power tool.

12. The power tool of claim 11, wherein the electrically off brake is operably coupled to the motor shaft, wherein when power is supplied to the motor, the electrically off brake allows the motor shaft to rotate, and when power is not supplied to the motor, the electrically off brake prevents rotation of the motor shaft.

13. The power tool of claim 12, wherein the electrically off brake mechanically clamps the motor shaft when power is not supplied to the motor to prevent rotation of the motor shaft.

14. The power tool of claim 11, further comprising a trigger that when actuated, causes power to be supplied to the motor to rotate the motor shaft.

15. A power tool including a drive portion adapted to engage a work piece and a motor with a motor shaft adapted to drive the drive portion, the power tool comprising:

a gear assembly operably coupled to the motor shaft and the drive portion and adapted to transfer rotational motion of the motor shaft to the drive portion; and a locking mechanism adapted to prevent rotation of at least one of the motor shaft, gear mechanism, and drive portion to allow for manual torque application to the work piece with the power tool, wherein the locking mechanism includes at least one of:

a plate that is movable between locked and unlocked positions, wherein when the plate is in the locked position, the plate prevents rotation of the motor shaft to allow for manual torque application, and when the plate is in the unlocked position, the plate allows the motor shaft to rotate;

a locking bar that is movable between locked and unlocked positions, wherein when the locking bar is in the locked position, the locking bar prevents rotation of the motor shaft to allow for manual torque application, and when the locking bar is in the unlocked position, the locking bar allows the motor shaft to rotate; and a sprag clutch operably disposed between the motor shaft and the gear assembly.

16. The power tool of claim 15, wherein the locking mechanism includes the plate and further includes a bias member adapted to bias the plate into the unlocked position.

17. The power tool of claim 15, wherein the plate includes first and second hole portions, and when the plate is in the unlocked position, a hex portion of the motor shaft is disposed in the first hole portion and the plate allows the motor shaft to rotate, and when the plate is in the locked position, the hex portion of the motor shaft is disposed in the second hole portion and the plate prevents rotation of the motor shaft to allow for manual torque application.

18. The power tool of claim 15, further comprising a trigger that when actuated, causes power to be supplied to the motor to rotate the motor shaft.

19. The power tool of claim 18, wherein the trigger is a toggle trigger actuatable in first and second toggle directions.

20. The power tool of claim 19, wherein when the toggle trigger is actuated in the first toggle direction, the motor causes the motor shaft to rotate in a first rotational direction, and when the toggle trigger is actuated in the second toggle direction, the motor causes the motor shaft to rotate in a second rotational direction.

* * * * *